(12) United States Patent
Kawano et al.

(10) Patent No.: US 6,674,854 B1
(45) Date of Patent: Jan. 6, 2004

(54) TELEPHONE TERMINAL DEVICE

(75) Inventors: Kazumi Kawano, Fukuoka (JP); Hiroshi Harada, Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 439 days.

(21) Appl. No.: 09/641,900

(22) Filed: Aug. 18, 2000

(30) Foreign Application Priority Data

Sep. 3, 1999 (JP) .......................................... 11-250012

(51) Int. Cl.⁷ ................................................ H04M 1/00
(52) U.S. Cl. .................................. 379/368; 379/433.07
(58) Field of Search ............................. 379/368, 433.06, 379/433.07; 200/5 A; 455/90.3, 575.1

(56) References Cited

U.S. PATENT DOCUMENTS 5,149,923 A * 9/1992 Demeo ........................ 200/5 A
6,310,609 B1 * 10/2001 Morgenthaler .............. 379/368

FOREIGN PATENT DOCUMENTS

JP          9-116611         5/1997

* cited by examiner

*Primary Examiner*—Jack Chiang
(74) *Attorney, Agent, or Firm*—McDermott, Will & Emery

(57) ABSTRACT

The exit light from the illuminating part illuminates each key button as a spot light. Hence, leak of light to the surrounding is prevented. As a result, the visual recognition is extremely improved, and easy-to-read type data can be displayed. A telephone terminal device includes a circuit board, and a plurality of key buttons disposed at the upper side of the circuit board. The circuit board has a through-hole, and the through-hole is positioned immediately beneath at least one key button of the plurality of key buttons, and each key button is illuminated by the light passing the through-hole.

19 Claims, 12 Drawing Sheets

Fig. 2 (a)  Fig. 2 (b)
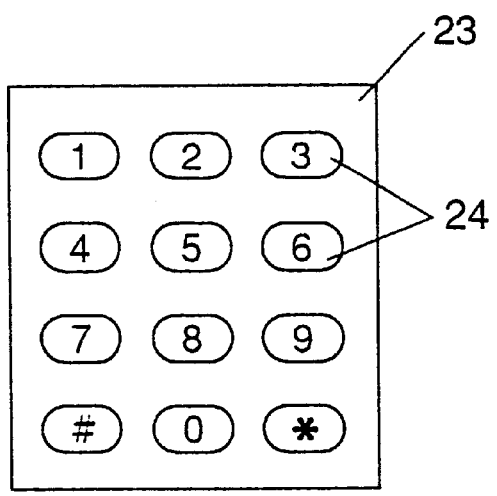
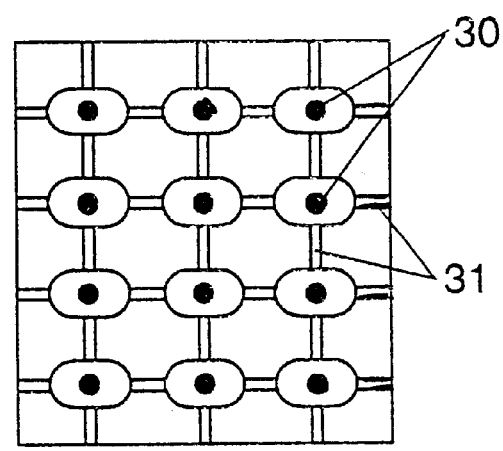

Fig. 9 (a)        Fig. 9 (b)
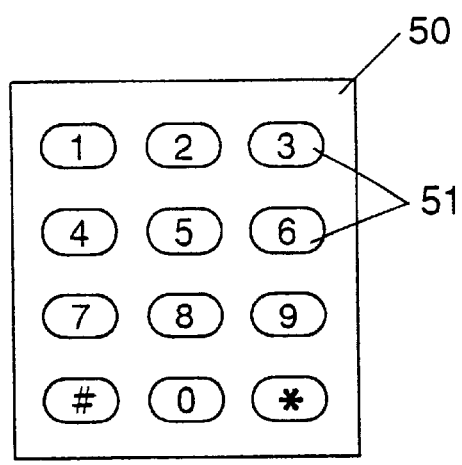
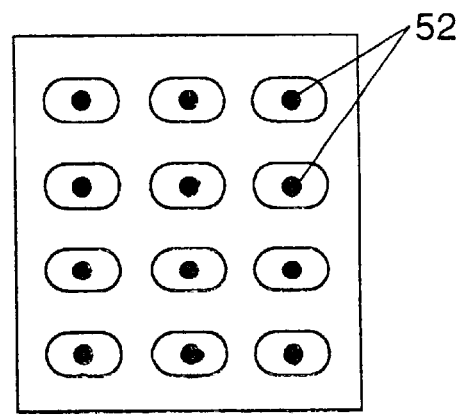
Fig. 10 (a)        Fig. 10 (b)
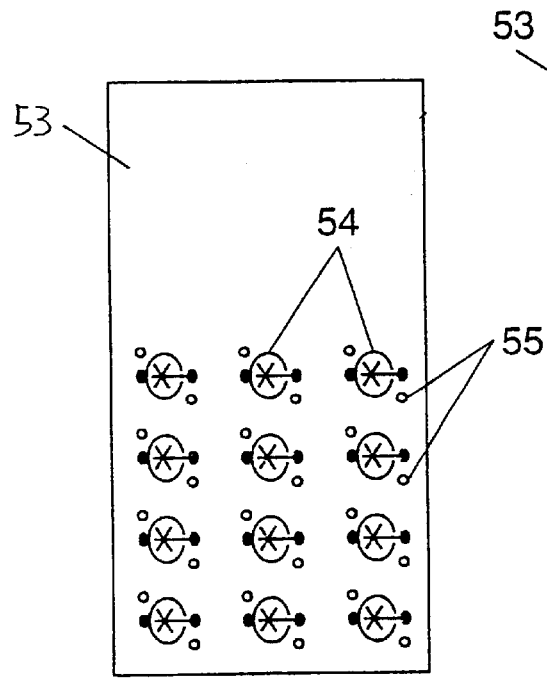
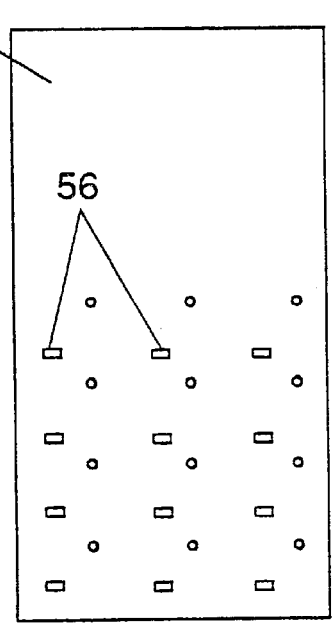

TELEPHONE TERMINAL DEVICE

TECHNICAL FIELD OF THE INVENTION

The present invention relates to a telephone terminal device such as cellular phone.

BACKGROUND OF THE INVENTION

Recently, the telephone terminal device such as cellular phone is provided with a liquid crystal device as standard equipment for the enhancement of convenience. The telephone number and other numerical data are displayed in the liquid crystal device. For reduction of size of the telephone terminal device itself, operation buttons are made of rubber or other elastic material which can be reduced in thickness and can give a click reaction feel. As display means of numerical data, the operation buttons are illuminated.

The structure of a cellular phone as an example of conventional telephone terminal device is explained by referring to FIG. 12 to FIG. 16.

FIG. 12 is an assembly sectional view of a conventional cellular phone, and the cellular phone comprises a back casing 1, a circuit board 2, a rubber button main body 3, key buttons 4, a liquid crystal device 5, a liquid crystal device cable 6, and a front casing 7. The circuit board 2 is responsible for the function of the cellular phone. The rubber button main body 3 composes an operation button section of the cellular phone. The key buttons 4 are actually pushed by the user. The key buttons 4 are light transmissive. Light transmissive means that transmissivity is not 0 (zero), including transparent and translucent. The liquid crystal device 5 conducts with the circuit board 2 through the liquid crystal device cable 6. The front casing 7 has button holes 8, and a liquid crystal device hole 9. The key button 4 is fitted into the button hole 8. The liquid crystal device hole 9 is provided so as to coincide with the screen of the liquid crystal device 5, so that the liquid crystal device 5 is seen from outside through the liquid crystal device hole 9.

FIG. 13(a) is a view of the rubber button main body 3 of the conventional cellular phone as seen from the side of the key buttons 4. FIG. 13(b) is a view of the rubber button main body 3 in FIG. 13(a) as seen from the opposite side. In FIG. 13(b), the rubber button main body 3 has contact points 10 and air vents 11. The contact points 10 are made of conductive material. When the user pushes the key buttons 4, air is pushed out, and flows into the air vents 11.

FIG. 14 is a view of the circuit board 2 of the conventional cellular phone as seen from the contact surface side of the circuit board 2 and rubber button main body 3. Contact circuits 12 are disposed at the same pitches at the contact points 10 of the rubber button main body 3, and are opened. Illuminating parts 13 such as LEDs are disposed in the circuit board 2.

FIG. 15 is a sectional magnified view of a key button 4 in a state of the rubber button main body 3 of the conventional cellular phone mounted on the circuit board 2. The illuminating part 13 is disposed between the circuit board 2 and the key button 4. A space 14 is formed around the contact point 10, and the air vent 11 has a height 15. The height 15 and the sectional area of the air vent 11 are adjusted so that the air staying in the space 14 may flows in smoothly.

FIG. 16 is a diagram showing display states of numerical data in the conventional cellular phone.

The structure of such conventional cellular phone, motion of the operation buttons, and display of numerical data are explained by referring to FIG. 12 to FIG. 16.

First, the rubber button main body 3 is fitted to the front casing 7 so that the key buttons 4 may be fitted into the button holes 8 in the front casing 7. The liquid crystal device 5 is connected to the circuit board 2 through the liquid crystal display device cable 6. Such circuit board 2 is fitted to the front casing 7 so that the liquid crystal screen of the liquid crystal device 5 may coincide with the liquid crystal device hole 9. At this time, when the key button 4 is pushed, each contact circuit 12 in the circuit board 2 is disposed at a position contacting with the contact point 10. Then the back casing 1 is coupled with the front casing 7.

In the cellular phone thus constructed, an example of procedure of operation of sending a call is explained.

The user first enters the partner's telephone number by pressing the key buttons 4. At this time, the air staying in the space 14 around the contact point 10 flows into the air vent 11 of the height 15. Therefore, the contact point 10 is pushed to contact with the contact circuit 12 on the circuit board 2. Accordingly, the contact circuit 12 which has been an open circuit now becomes a closed circuit by way of the contact point 10, and the circuit board 2 recognizes that the key button 4 has been pushed. As a result, the numerical data of the pushed key button 4 is displayed in the liquid crystal device 5.

Thus, after input operation of the telephone number, the user manipulates the key button 4. By the manipulation of the key button 4, the illuminating part 13 immediately beneath the key button 4 showing the numeral of the numerical data entered in the first place lights up. Then the illuminating part 13 goes out in a specific time. Similarly, the illuminating part 13 immediately beneath the key button 4 showing the numeral of the numerical data entered next lights up, and goes out in a specific time. In this way, each motion is repeated sequentially by the number of numerals of the numerical data being entered. In the illuminated key button 4, the light passes and the surface of the key button 4 becomes bright.

This state is shown in FIG. 16. However, the partner's telephone number may be displayed or not displayed in the liquid crystal device 5.

Then the user recognizes the numerals of the illuminated key buttons 4, and confirms the numerals of the partner's telephone number. The user pushes the send button, and the calling operation is done.

An example of procedure of operation of receiving a call is explained.

When called, by the caller's number notice function, the caller's telephone number is displayed in the liquid crystal device 5 as numerical data. Simultaneously when called, the user manipulates the key button 4, and the illuminating part 13 immediately beneath the key button 4 showing the first numeral of the numerical data lights up, and goes out in a specific time. Then the above calling operation is repeated. Such motion is repeated sequentially one by one by the number of numerals of the numerical data displayed in the liquid crystal device 5. Thus, the surface of each key button 4 becomes bright.

This state is same as in the calling operation, and is shown in FIG. 16.

The partner's telephone number may be displayed or not displayed in the liquid crystal device 5.

The user recognizes the numerals of the illuminated key buttons 4, and confirms the caller's telephone number, and knows who is calling before receiving the call. The user pushes the receive button, and the receiving operation is done.

However, such cellular phone or telephone terminal device involves the following problems.

The cellular phone or telephone terminal device aims at thickness in 1 mm unit, weight in 1 g unit and volume in 1 cc unit in order to satisfy the market demand for wearable device and seek the ultimate convenience. Therefore, downsizing of the casing of the telephone terminal device is promoted, and the liquid crystal device is further reduced in size.

In such situation, the type size of numerical data displayed in the screen of the liquid crystal device is becoming smaller. Besides, as the number of digits of cellular telephone number is increased, the type size of the numerical data must be further reduced in order to display the numerical data fully on the liquid crystal screen.

As one of means for these purposes, as mentioned in the prior art, each key button showing the numeral of the numerical data may be illuminated one by one sequentially.

In the conventional telephone terminal device, however, illuminating parts are disposed between the circuit board and key buttons, and the illuminating parts are disposed at positions protruding from the circuit board to the key buttons. In the conventional illuminating means of such composition, the exit light from the illuminating part is not converged, but spreads and enters the key button. Accordingly, the exit light from the illuminating part positioned at the manipulated key button enters also the adjacent key button. That is, leak of light to the adjacent button increases. It is hence difficult to discriminate the illuminated key button and non-illuminated adjacent key button. Or the illuminated key button and the non-illuminated adjacent key button are confusing.

In this state, when the user attempts to recognize the numerical data displayed on the liquid crystal screen, or the illuminated key button, the user is difficult to identify the numerical data or key button. Also, the telephone terminal device is not easy to use.

It is hence an object of the invention to present a telephone terminal device capable of easily recognizing the numerical data and illuminated key buttons.

SUMMARY OF THE INVENTION

A telephone terminal device of the invention comprises:
  a circuit board, and
  a plurality of key buttons disposed at the upper side of the circuit board,
  in which the circuit board has a through-hole, the through-hole is positioned at an underneath direction of at least one key button of the plurality of key buttons, and each key button is illuminated by the light passing by way of the through-hole.

In this structure, the exit light from the illuminating part illuminates each key button as a spot light. It hence prevents leak of light to the surrounding. As a result, numerical data display excellent in visual recognition and easy to read is realized.

Other telephone terminal device of the invention comprises:
  a plurality of key buttons, and illuminating parts,
  in which each key button of the plurality of key buttons displays at least one type selected from the group consisting of numeral, character, symbol, and graphic pattern, each key button being pushed is illuminated by the light emitted from the illuminating part, and all the pushed key buttons are selectively illuminated and displayed in the plurality of key buttons.

In this structure, the user can confirm the information of the type data or the like expressed by a larger type. Hence, easy-to-read numerical data can be displayed.

BRIEF DESCRIPTION OF THE DRAWINGS

FIG. 2(a) is a plan of a rubber button main body used in the cellular phone of the embodiment as seen from the key button side, and FIG. 2(b) is a plan seen from the opposite side.

FIG. 9(a) is a plan of a rubber button main body used in a cellular phone of exemplary embodiment 4 of the invention as seen from the key button side, and FIG. 9(b) is a plan seen from the opposite side.

FIG. 10(a) is a plan of a circuit board used in the cellular phone of the embodiment as seen from the contact surface side of the circuit board with the rubber button main body, and FIG. 10(b) is a plan seen from the opposite side.

DETAILED DESCRIPTION OF THE INVENTION

Figure 1:
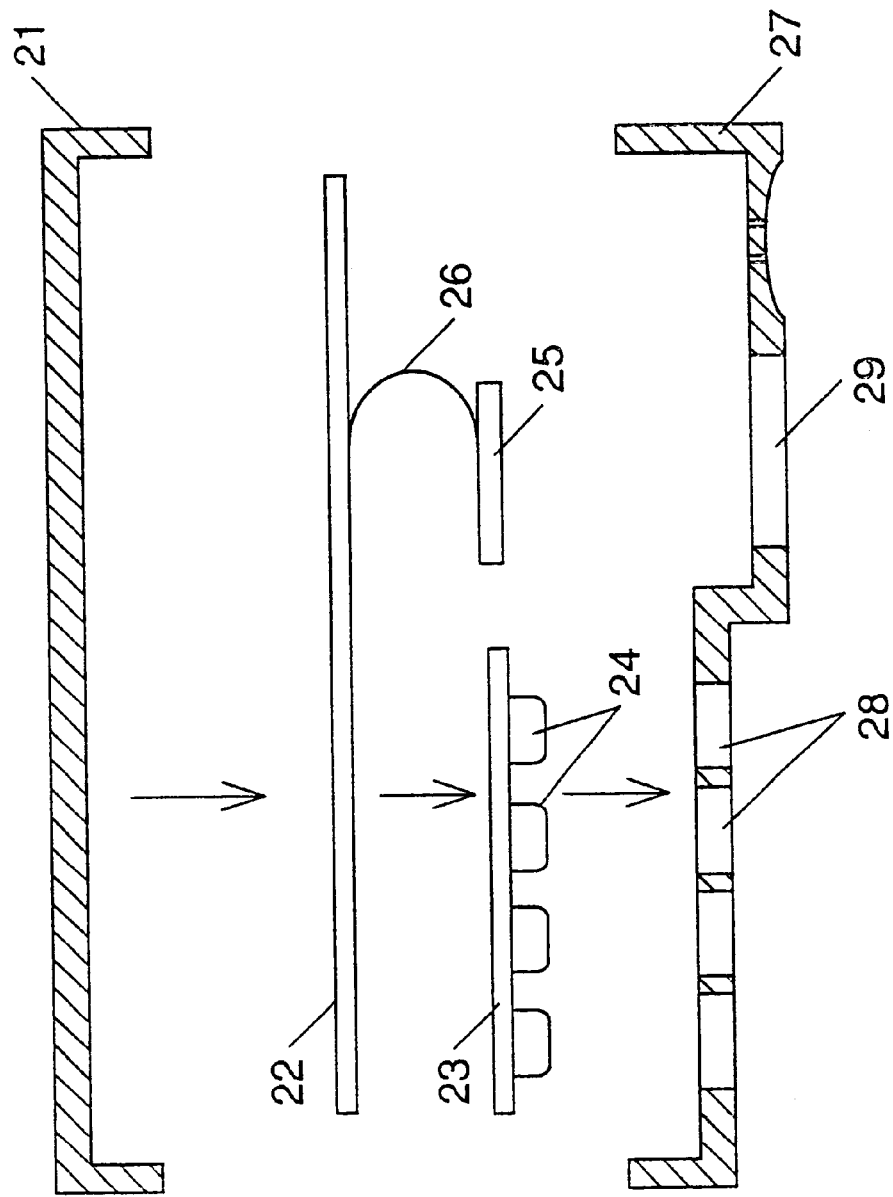
FIG. 1 is an assembly sectional view of a cellular phone in exemplary embodiment 1 of the invention.
Figure 3:
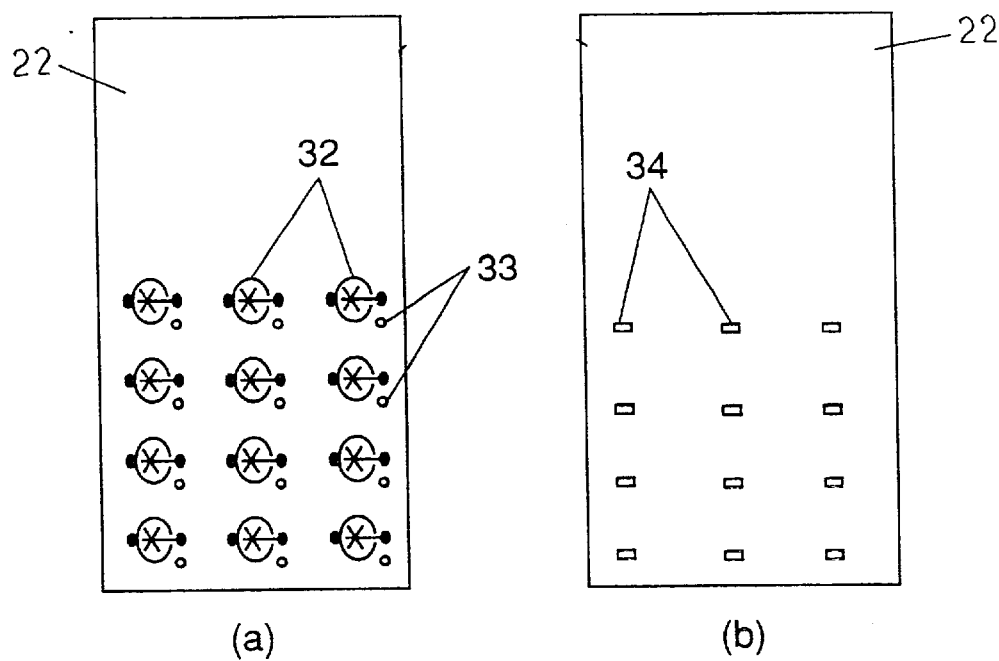
FIG. 3(a) is a plan of a circuit board used in the cellular phone of the embodiment as seen from the contact surface side with the rubber button main body.
FIG. 3(b) is a plan seen from the opposite side.

A telephone terminal device in an embodiment of the invention comprises a circuit board, a plurality of key buttons, and illuminating parts. The circuit board has through-holes formed at positions immediately beneath the key buttons. Each of the through-holes is formed at position an underneath direction of at least one key button of the plurality of key buttons. An illuminating part is mounted at a position for illuminating the key button through this through-hole. When displaying numeric data in this telephone terminal device, the illuminating part immediately beneath the key button displaying the numeral of this numerical data lights up, and this key button is illuminated.

In this structure, the exit light from the illuminating part illuminates each key button by a spot light. Hence, leak of light to the surrounding is prevented. As a result, the visual recognition is extremely improved, and easy-to-read numerical data can be displayed.

The telephone terminal device in an embodiment of the invention is a telephone terminal device for displaying a telephone number by sequentially illuminating a plurality of key buttons displaying numerals. The key buttons are illuminated by way of the through-holes in the circuit board immediately beneath the key buttons. In this structure, the exit light from the illuminating part illuminates each key button by a spot light. Hence, leak of light to the surrounding is prevented. As a result, the visual recognition is extremely improved, and easy-to-read numerical data can be displayed. Moreover, it is easy to recognize the numerals of the illuminated key buttons. Therefore, the numerical data of the telephone number can be confirmed securely.

The telephone terminal device in other embodiment of the invention comprises a circuit board responsible for function control, and an operation button main body having a plurality of key buttons. At least the key buttons of the operation button main body are light transmissive. The key buttons display types such as numeral, character, symbol, and graphic pattern. The circuit board has through-holes provided at positions immediately beneath the key buttons. Illuminating parts are disposed at positions for illuminating the key buttons by way of the through-holes. In this structure, the exit light from the illuminating part illuminates each key button by a spot light. Hence, leak of light to the surrounding is prevented. As a result, the visual recognition is extremely improved. That is, easy-to-read numerical data can be displayed.

Preferably, the key buttons are illuminated sequentially to display a telephone number. In this structure, it is easy to recognize the numerals of the illuminated key buttons. Therefore, the numerical data of the telephone number can be confirmed securely.

Preferably, the operation button main body is made of an elastic material. In this structure, it is possible to form thinly, and a click reaction is felt when the operation button is pushed.

Preferably, the circuit board has a plurality of through-holes. In this structure, air vents are not needed in the operation button main body. Therefore, the thickness of the operation button main body is reduced by the portion of the thickness corresponding to the height dimension of the air vents. As a result, the telephone terminal device is reduced in size. Further, the convenience is enhanced.

Preferably, the sectional area of through-holes in the circuit board is more than the projection area of the illuminating parts. In this structure, air vents are not needed in the operation button main body. Therefore, the thickness of the operation button main body is reduced by the portion of the thickness corresponding to the height dimension of the air vents. As a result, the telephone terminal device is reduced in size. Further, the convenience is enhanced.

Preferably, the plurality of key buttons are illuminated selectively, and the plurality of key buttons display information of numerals, characters and symbols. In this structure, the user can confirm the information of numerical data or the like expressed by a larger type. As a result, it is much easier to read.

Preferably, the key buttons are illuminated by way of the through-holes in the circuit board immediately beneath the key buttons. In this structure, the exit light from the illuminating part illuminates each key button by a spot light. Hence, leak of light to the surrounding is prevented. As a result, the visual recognition is extremely improved. That is, easy-to-read numerical data can be displayed.

The telephone terminal device in a different embodiment of the invention comprises a circuit board responsible for function control, and an operation button main body having a plurality of key buttons. At least the key buttons of the operation button main body are light transmissive. Numerals, characters, symbols, and others are displayed in the key buttons. Illuminating parts for illuminating the key buttons are disposed in the circuit board. As the plurality of key buttons are illuminated selectively, the information of numerals, characters, symbols, and others is displayed in the plurality of key buttons. In this structure, the user can confirm the information of numerical data or the like expressed by a larger type. As a result, it is much easier to read.

Preferably, the circuit board has through-holes provided at positions immediately beneath the key buttons. Illuminating parts are disposed at positions for illuminating the key buttons by way of the through-holes. In this structure, the exit light from the illuminating part illuminates each key button by a spot light. Hence, leak of light to the surrounding is prevented. As a result, the visual recognition is extremely improved. That is, easy-to-read numerical data can be displayed.

Preferably, the operation button main body is made of an elastic material. In this structure, it is possible to form thinly, and a click reaction is felt when the operation button is pushed.

Preferably, the circuit board has a plurality of through-holes. In this structure, air vents are not needed in the operation button main body. Therefore, the thickness of the operation button main body is reduced by the portion of the thickness corresponding to the height dimension of the air vents. As a result, the telephone terminal device is reduced in size. Further, the convenience is enhanced.

Preferably, the sectional area of through-holes in the circuit board is more than the projection area of the illuminating parts. In this structure, air vents are not needed in the operation button main body. Therefore, the thickness of the operation button main body is reduced by the portion of the thickness corresponding to the height dimension of the air vents. As a result, the telephone terminal device is reduced in size. Further, the convenience is enhanced.

Preferably, the plurality of key buttons are formed in three rows and five lines or more. In this structure, the information of numerals, characters, symbols and others can be displayed clearly, and in particular, numerals 1 to 0, and alphabet can be displayed in normal forms.

Telephone terminal devices in exemplary embodiments of the invention are explained below while referring to FIG. 1 to FIG. 11.

In these drawings, same parts are identified with same reference numerals, and duplicated explanations are omitted.

As the telephone terminal device, examples of cellular phone are explained.

EXEMPLARY EMBODIMENT 1

FIG. 1 to FIG. 5 show the structure of the cellular phone, configuration of operation buttons, and display state of numerical data according to exemplary embodiment 1 of the invention.

FIG. 1 is an assembly sectional view of a cellular phone in exemplary embodiment 1 of the invention. The cellular phone comprises a back casing 21, a circuit board 22, an operation button main body 23, key buttons 24, a liquid crystal device 25, a liquid crystal device cable 26, and a front casing 27. The rubber button main body as the operation button main body 23 has a plurality of key buttons 24. The individual key buttons 24 of the plurality of key buttons show types such as numerals, characters, symbols, and graphic patterns.

The circuit board 22 is responsible for the function of cellular phone. The rubber button main body 23 forms the operation buttons of the cellular phone. The key buttons 24 are actually pushed by the user. The key buttons 24 are light transmissive. Light transmissive means that transmissivity is not 0 (zero), including transparent and translucent. The liquid crystal device 25 conducts with the circuit board 22 by way of the liquid crystal device cable 26. The front casing 27 has button holes 28 and a liquid crystal device hole 29. The key buttons 24 are fitted into the button holes 28. In order that the liquid crystal device 25 may be recognized from outside, the liquid crystal device hole 29 is formed at the mutually coinciding position of the screen of the liquid crystal device 25 and the liquid crystal device hole 29.

FIG. 2(a) is a plan of a rubber button main body 23 of the cellular phone as seen from the key button 24 side, and FIG. 2(b) is a plan seen from the opposite side. In FIG. 2(b), contact points 30 are made of conductive material. When the user pushes a key button 24, the air is pushed out and flows into the air vent 31.

FIG. 3(a) is a plan of a circuit board 22 of the cellular phone as seen from the contact surface side of the circuit board 22 with the rubber button main body 23, and FIG. 3(b) is a plan seen from the opposite side. In FIG. 3(a), contact circuits 32 are disposed at same pitches as the contact points 30 in the rubber button main body 23, and are opened. Through-holes 33 are disposed adjacently to the contact circuits 32. In FIG. 3(b), illuminating parts 34 such as LEDs are disposed. The illuminating parts 34 are arranged so that the light may be emitted in the direction of side of the key buttons 24 of the rubber button main body 23 by way of the through-holes 33. All through-holes are arranged similarly as shown in FIG. 3(b).

Figure 4:
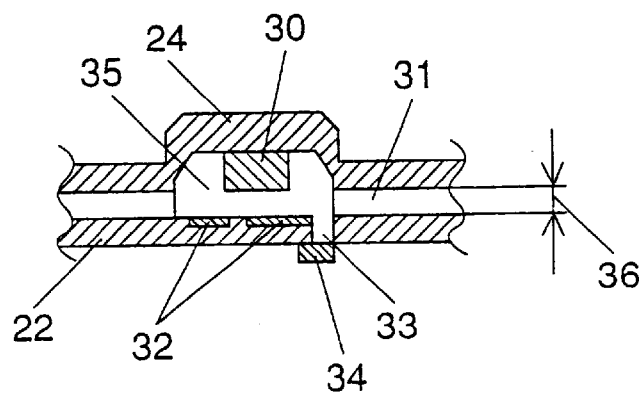
FIG. 4 is a sectional magnified view of one key button of the rubber button main body used in the cellular phone of the embodiment, showing one key button in a state fitted to the circuit board.

FIG. 4 is a sectional magnified view of the rubber button main body 23 of the cellular phone, showing one key button 24 in a state fitted to the circuit board 22. A height 36 and the sectional area of the air vent are adjusted so that the air staying in the space 35 around the contact point may flow in smoothly.

Figure 5:
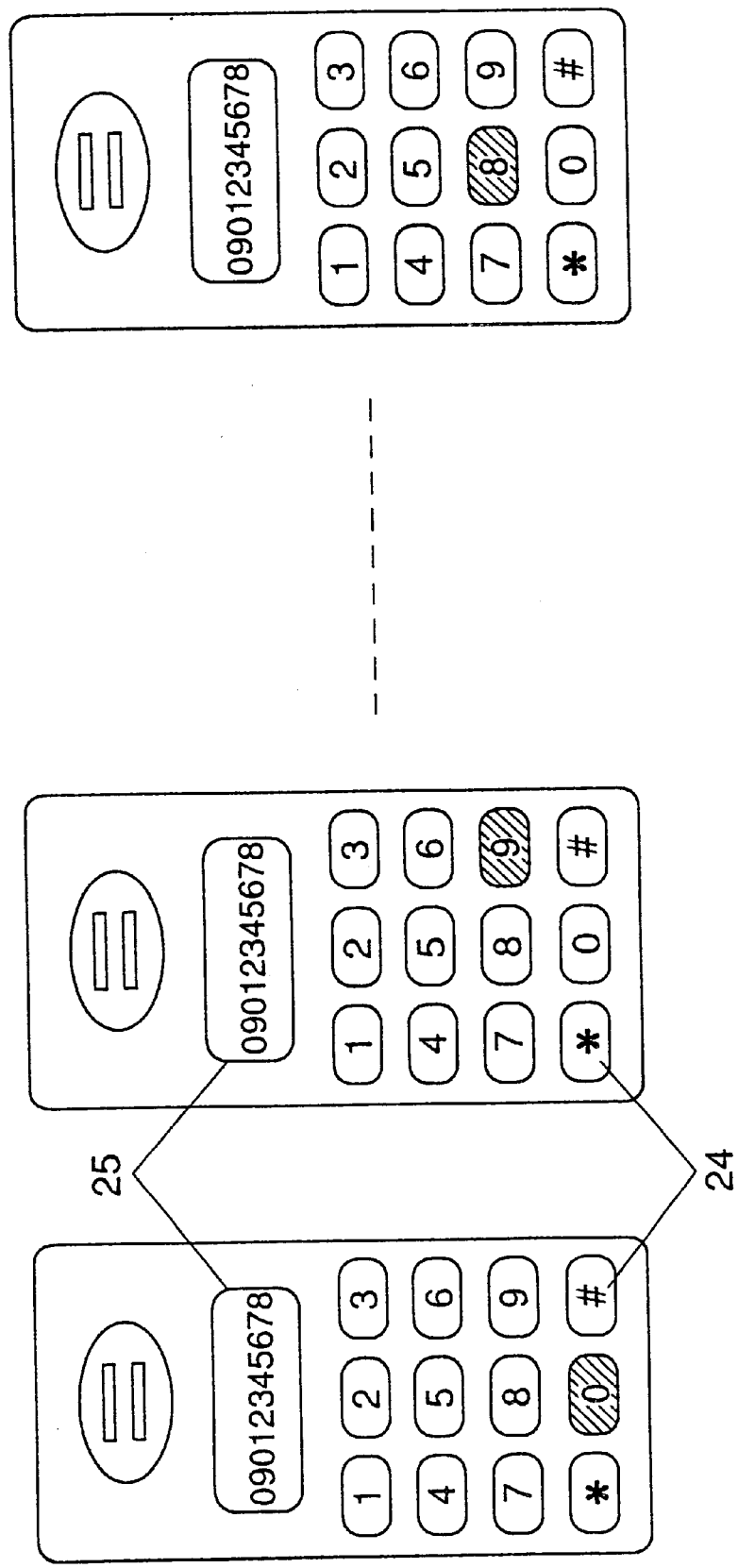
FIG. 5 is a plan showing a numerical data display state of the cellular phone of the embodiment.

FIG. 5 is a plan showing a numerical data display state of the cellular phone of exemplary embodiment 1.

The structure of this cellular phone, motion of operation button, and display state of type data are explained below while referring to FIG. 1 to FIG. 5.

First, the rubber button main body 23 is fitted to the front casing 27 so that the key buttons 24 of the rubber button main body 23 may be fitted into button holes 28 of the front casing 27. Then, the liquid crystal device 25 is connected to the circuit board 22 through the liquid crystal device cable 26. The circuit board 22 having such structure is fitted to the front casing 27 so that the liquid crystal screen of the liquid crystal device 25 may coincide with the liquid crystal device hole 29. At this time, these parts are set in such configuration that the contact circuits 32 in the circuit board 22 may contact with the contact points 30 when the key buttons 24 are pushed. Then the back casing 21 is coupled with the front casing 27.

In thus constructed cellular phone, an example of procedure of operation of sending a call is explained below.

The user first enters the partner's telephone number by pressing the key buttons 24. At this time, the air staying in the space 35 around the contact point 30 flows into the air vent 31 of the height 36. Therefore, the contact point 30 is pushed to contact with the contact circuit 32 on the circuit board 22. Accordingly, the contact circuit 32 which has been an open circuit now becomes a closed circuit by way of the contact point 30, and the circuit board 22 recognizes that the key button 24 has been pushed. As a result, the numerical data of the pushed key button 24 is displayed in the liquid crystal device.

Thus, after input operation of the telephone number, when the user manipulates the key button 24, the illuminating part 34 immediately beneath the key button 24 showing the numeral of the numeric data entered in the first place lights up, and then goes out in a specific time. Similarly, the illuminating part 34 immediately beneath the key button 24 showing the numeral of the numerical data entered next lights up, and goes out in a specific time. In this way, each motion is repeated sequentially by the number of numerals of the numerical data being entered.

At this time, the exit light from the illuminating part 34 is emitted to the key button 24 by way of the through-hole 33. Therefore, the light enters the key button 24 as a spot light. In the illuminated key button 24, the light transmits and brightens the surface of the key button 24. The duration of illuminating each key button 24 is set to be enough for the user to recognize the numeral of the illuminated key button 24.

This state is shown in FIG. 5. However, the partner's telephone number may be displayed or not displayed in the liquid crystal device 25. In the embodiment shown in FIG. 5, the key buttons showing the numerals are lit up and put out repeatedly in the sequence of 09012345678.

Then the user recognizes the numerals of the illuminated key buttons 24. As a result, the numerical data of the partner's telephone number is confirmed. The user pushes the send button, and the calling operation is done.

An example of procedure of operation of receiving a call is explained.

When called, by the caller's number notice function, the caller's telephone number is displayed in the liquid crystal device 25 as numerical data. Simultaneously with display of the numerical data, the user manipulates the key button 24, and the illuminating part 34 immediately beneath the key button 24 showing the first numeral of the numerical data lights up, and goes out in a specific time. Then by the same operation as in the above operation of sending a call, such motion is repeated sequentially one by one by the number of numerals of the numerical data displayed in the liquid crystal device 25. Thus, the surface of each key button, 24 becomes bright. This state is same as in the calling operation, and the numerical data display state is shown in FIG. 5.

Same as in the case of sending a call, the duration of illuminating each key button 24 is set to be enough for the user to recognize the numeral of the illuminated key button 24. The partner's telephone number may be displayed or not displayed in the liquid crystal device 25.

The user recognizes the numerals of the illuminated key buttons 24, and confirms the caller's telephone number. Hence it is known who is calling before receiving the call. The user pushes the receive button, and the receiving operation is done.

Thus, in the telephone terminal device of exemplary embodiment 1, since the exit light from the illuminating part is emitted by way of the through-hole, the exit light from the illuminating part illuminates each key button as a spot light. Accordingly, the light does not leak to the surrounding. As a result, the numerical data can be displayed with an excellent visual recognition.

This exemplary embodiment may be also composed without using the liquid crystal device.

EXEMPLARY EMBODIMENT 2

Figure 6:
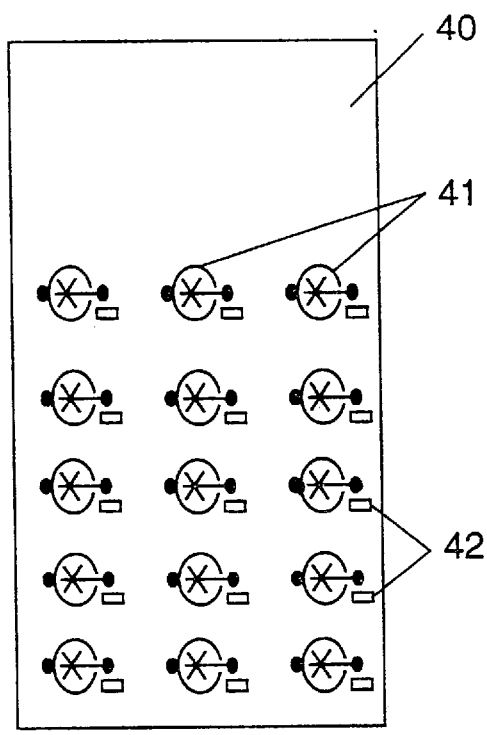
FIG. 6 is a plan of a circuit board used in a cellular phone of exemplary embodiment 2 of the invention as seen from the contact surface side with a rubber button main body.
Figure 7:
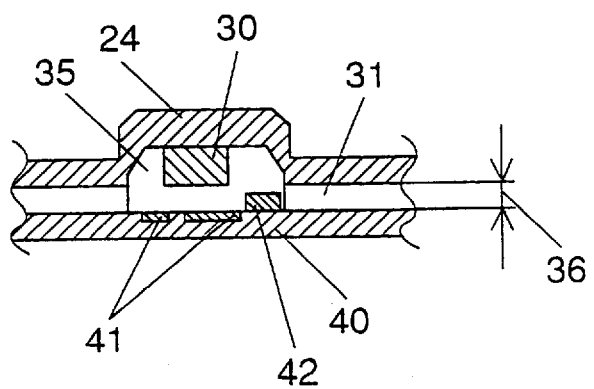
FIG. 7 is a sectional magnified view of the rubber button main body used in the cellular phone of the embodiment, showing one key button in a state fitted to the circuit board.
Figure 8:
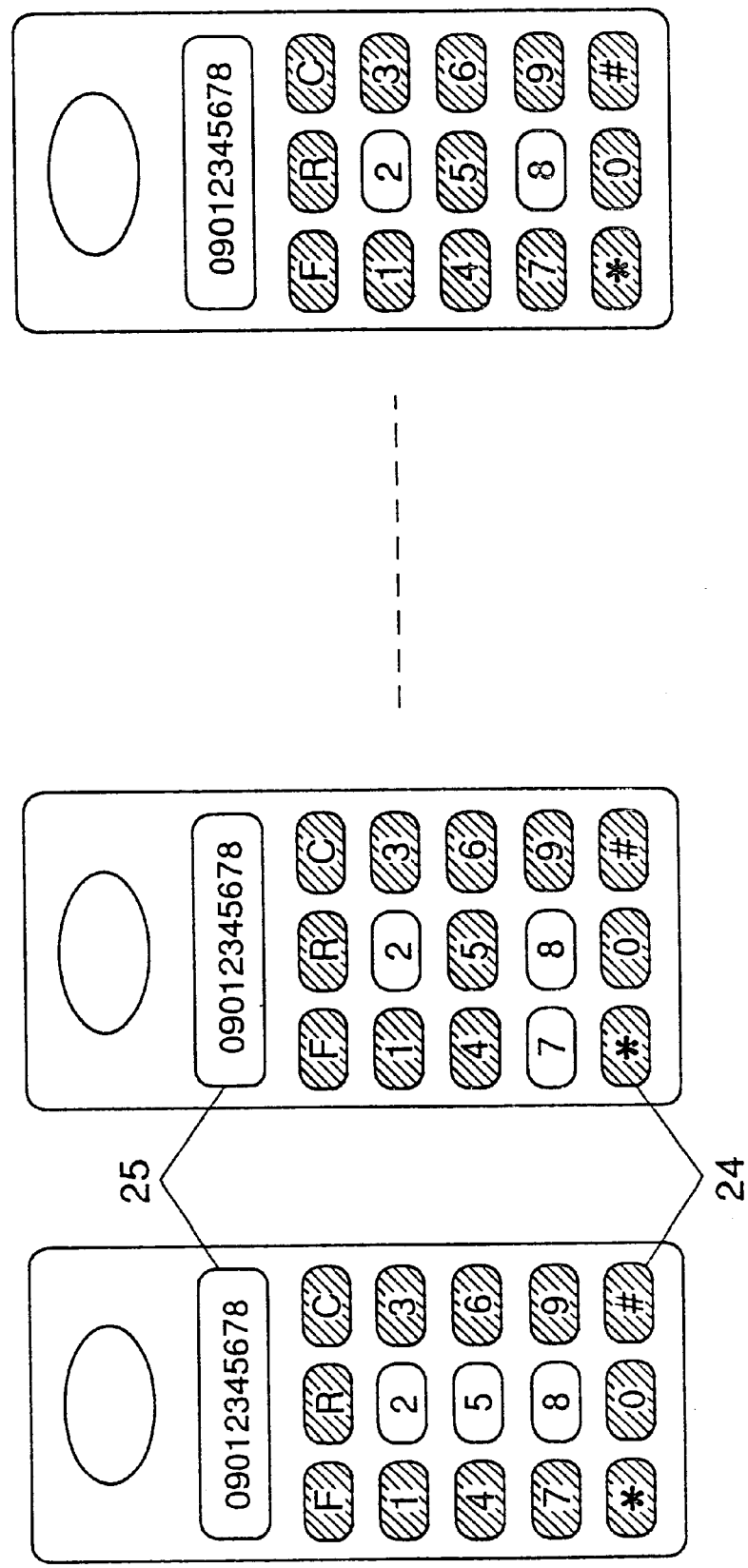
FIG. 8 is a plan showing a numerical data display state of the cellular phone of the embodiment.

FIG. 6 to FIG. 8 show the structure of the cellular phone, configuration of operation buttons, and display state of numerical data according to exemplary embodiment 2 of the invention. In this exemplary embodiment 2, the structure of the cellular phone and configuration of operation buttons are same as in exemplary embodiment 1 explained in FIG. 1 and FIG. 2, except that the key buttons 24 of the rubber button main body 23 are composed of three rows and five lines.

FIG. 6 is a plan of a circuit board 40 in exemplary embodiment 2, as seen from the contact surface side of the circuit board 40 with the rubber button main body 23. In FIG. 6, contact circuits 41 are disposed at the same pitch at the contact points 30 of the rubber button main body 23, and these contact circuits 41 are open. Illuminating parts 42 such as LEDs are mounted adjacently to the contact circuits 41. The illuminating parts 42 are mounted on the circuit board 40 so that the light may be illuminated in the direction of the side of the key buttons 24 of the rubber button main body 23.

FIG. 7 is a sectional magnified view of the rubber button main body 23 of the cellular phone, showing one key button 24 in a state fitted to the circuit board 40.

FIG. 8 is a plan showing a numerical data display state of the cellular phone of exemplary embodiment 2 of the invention.

In the cellular phone having such structure, the configuration and motion of operation buttons are same as in exemplary embodiment 1. Display of numerical data is explained below, for example, relating to operation of sending a call.

First, by the same manipulation of the operation buttons as in exemplary embodiment 1, the user enters the partner's telephone number by pressing the key buttons 24. By this operation, the contact circuit 41 which has been an open circuit now becomes a closed circuit by way of the contact point 30. As a result, the circuit board 40 recognizes that the key button 24 has been pushed, and the numerical data of the pushed key button 24 is displayed in the liquid crystal device 25.

Thus, after input operation of the telephone number, when the user manipulates the key button 24, to express the numeral of the numerical data entered in the first place by using all key buttons 24, the illuminating part 42 immediately beneath the corresponding key button 24 lights up, and then goes out in a specific time. Similarly, to express the numeral of the numerical data entered next by using all key buttons 24, the illuminating part 42 immediately beneath the corresponding key button 24, lights up, and then goes out in a specific time. In this way, each motion is repeated sequentially by the number of numerals of the numerical data being entered. Thus, all entered numerical data is displayed. In the illuminated key button 24, the light penetrates and brightens the surface of the key button 24. The duration of expressing one numeral is set to be enough for the user to recognize the expressed numeral. Thus, among all key buttons 24, key buttons necessary for expressing the numeral of the numerical data are selected and lit up. The numerical data is displayed in this manner. That is, the numerical data is formed by the plural illuminated key buttons.

This state is shown in FIG. 8. However, the partner's telephone number may be displayed or not displayed in the liquid crystal device 25. In the example shown in FIG. 8, the key buttons 24 necessary for expressing the numeral of the numerical data are selectively lit up and put out repeatedly in the sequence of 09012345678.

Then the user recognizes the numerals expressed by using all key buttons 24 one by one sequentially. As a result, the user confirms the numerical data of the partner's telephone number, and pushes the send button. Thus the calling operation is done.

An example of procedure of operation of receiving a call is explained.

When called, by the caller's number notice function, the caller's telephone number is displayed in the liquid crystal device 25 as numerical data. Simultaneously with display of numerical data, when the user manipulates the key button 24, to express the first numeral of the numerical data by using all key buttons 24, the illuminating part 42 immediately beneath the corresponding key button 24 lights up, and then goes out in a specific time. Then the same operation as when sending a call is repeated. The same motion is repeated by the number of numerals in the numerical data displayed in the liquid crystal device 25. The surface of each key button 24 becomes bright. This state is same as when sending a call, and the display state of numerical data is shown in FIG. 8.

Same as when sending a call, the duration of expressing one numeral is set to be enough for the user to recognize the expressed numeral. The partner's telephone number may be displayed or not displayed in the liquid crystal device 25.

The user recognizes the individual numerals expressed by using all key buttons 24 sequentially, and confirms the caller's telephone number. Hence the user knows who is calling before receiving the call. The user pushes the receive button, and the receiving operation is done.

Thus, in the telephone terminal device of exemplary embodiment 2, the numerical data is expressed by using all key buttons 24. Hence, the numerical data displayed by a larger type can be confirmed. As a result, the visual recognition is further enhanced.

This exemplary embodiment 2 may be also composed without using the liquid crystal device.

The data to be expressed by using all key buttons is not limited to numerical data, but character data and others may be also expressed similarly.

EXEMPLARY EMBODIMENT 3

The structure of the cellular phone and configuration of operation buttons in exemplary embodiment 3 are same as in exemplary embodiment 1 explained in FIG. 1 to FIG. 4. The key buttons 24 of the rubber button main body 23 are composed of three rows and five lines. The display state of numerical data is same as in FIG. 8 relating to exemplary embodiment 2.

In the cellular phone having such structure, the configuration and motion of operation buttons are same as in exemplary embodiment 1. Display of numerical data is explained below, for example, relating to operation of sending a call.

First, by the same manipulation of the operation buttons as in exemplary embodiment 1, the user enters the partner's telephone number by pressing the key buttons 24. By this operation, the numerical data is displayed in the liquid crystal device 25.

After input operation of the telephone number, when the user manipulates the key button 24, to express the numeral of the numerical data entered in the first place by using all key buttons 24, the illuminating part 34 immediately beneath the corresponding key button 24 lights up, and then goes out in a specific time. Similarly, to express the numeral of the numeric data entered next by using all key buttons 24, the illuminating part 34 immediately beneath the corresponding key button 24 lights up, and then goes out in a specific time. In this way, each motion is repeated sequentially by the number of numerals of the numeric data being entered. Thus, all entered numerical data is displayed.

The exit light from the illuminating part 34 is emitted to the key button 24 by way of the through-hole 33. Therefore, the light enters the key button 24 as a spot light. The light passes through the illuminated key button 24, and brightens the surface of the key button 24. The duration of expressing one numeral is set to be enough for the user to recognize the expressed numeral.

The display state of numerical data is shown in FIG. 8. However, the partner's telephone number may be displayed or not displayed in the liquid crystal device 25.

Then the user recognizes the numerals expressed by using all key buttons 24 one by one sequentially. As a result, the user confirms the numerical data of the partner's telephone number, and pushes the send button. Thus the calling operation is done.

An example of procedure of operation of receiving a call is explained.

When called, by the caller's number notice function, the caller's telephone number is displayed in the liquid crystal device 25 as numerical data. Simultaneously with display of numerical data, when the user manipulates the key button 24, to express the first numeral of the numerical data by using all key buttons 24, the illuminating part 34 immediately beneath the corresponding key button 24 lights up, and then goes out in a specific time. Then the same operation as when sending a call is repeated. The same motion is repeated by the number of numerals in the numerical data displayed in the liquid crystal device 25. The surface of each key button 24 becomes bright. This state is same as shown in FIG. 8.

Same as when sending a call, the duration of expressing one numeral is set to be enough for the user to recognize the expressed numeral. The partner's telephone number may be displayed or not displayed in the liquid crystal device 25.

The user recognizes the individual numerals expressed by using all key buttons 24 sequentially, and confirms the caller's telephone number. Hence the user knows who is calling before receiving the call. The user pushes the receive button, and the receiving operation is done.

Thus, according to the structure of the telephone terminal device of exemplary embodiment 3, the exit light from the illuminating part illuminates each key button as a spot light. Hence, leak of light to the surrounding is prevented. As a results it is further easier to read the display, and the ease of use is much more enhanced.

This exemplary embodiment 3 may be also composed without using the liquid crystal device.

The data to be expressed by using all key buttons is not limited to numerical data, but character data and others may be also expressed similarly.

EXEMPLARY EMBODIMENT 4

Figure 11:
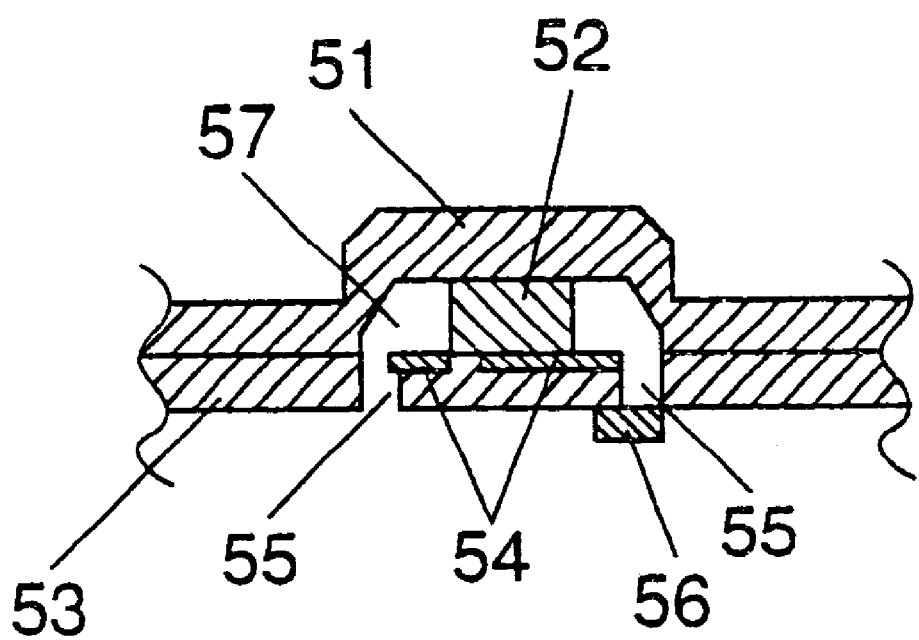
FIG. 11 is a sectional magnified view of the rubber button main body used in the cellular phone of the embodiment, showing one key button in a state fitted to the circuit board.
Figure 12:
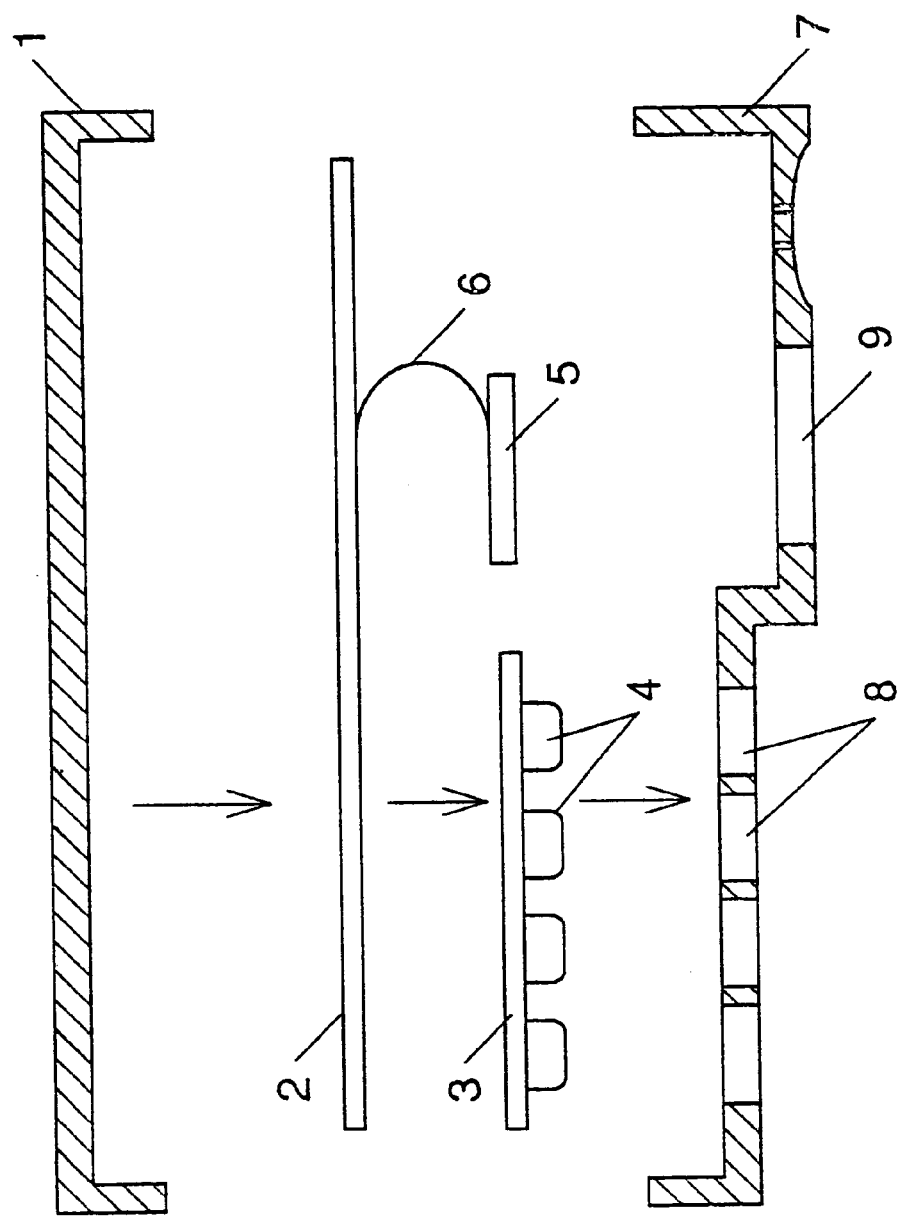
FIG. 12 is an assembly sectional view of a conventional cellular phone.
Figure 13A:
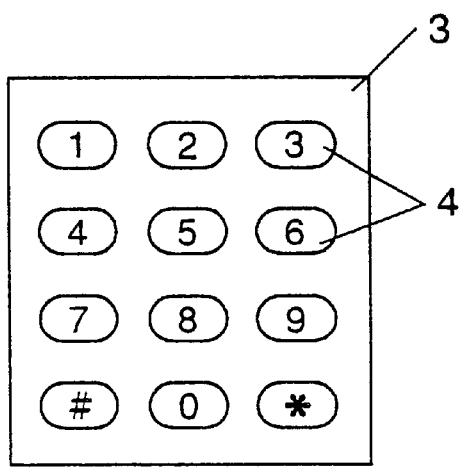
FIG. 13(a) is a plan of a rubber button main body used in the conventional cellular phone as seen from the key button side.
Figure 13B:
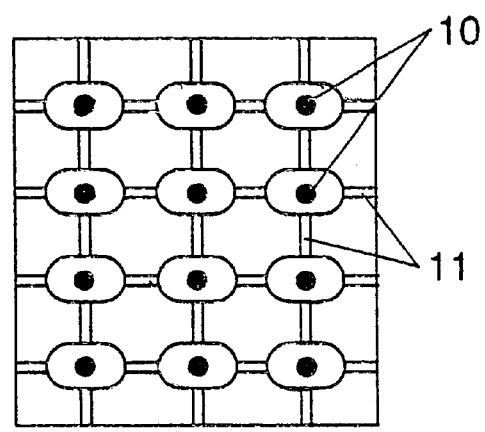
FIG. 13(b) is a plan seen from the opposite side.
Figure 14:
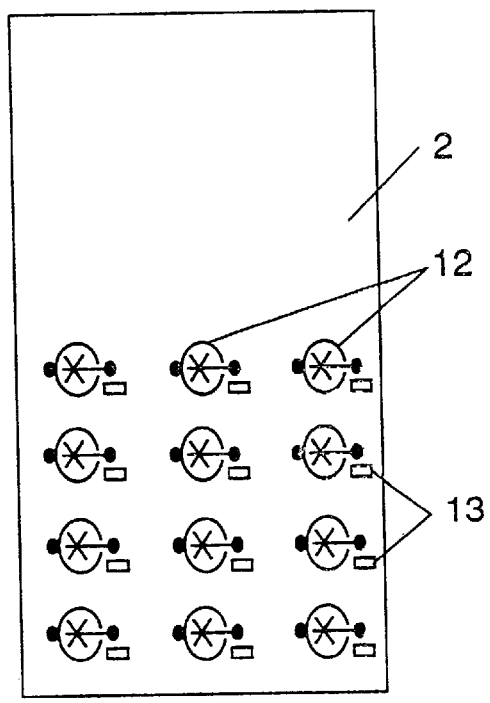
FIG. 14 is a plan of a circuit board used in the conventional cellular phone as seen from the contact surface side of the circuit board with the rubber button main body.
Figure 15:
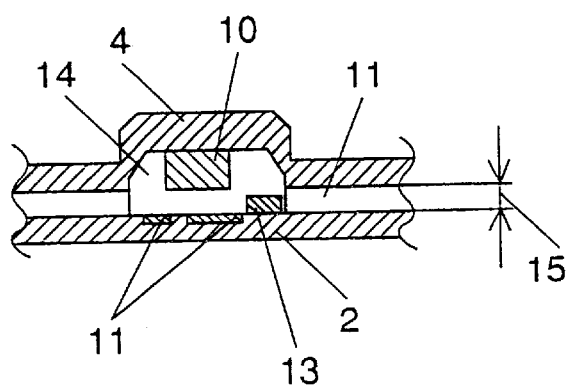
FIG. 15 is a sectional magnified view of the rubber button main body used in the conventional cellular phone, showing one key button in a state fitted to the circuit board.
Figure 16:
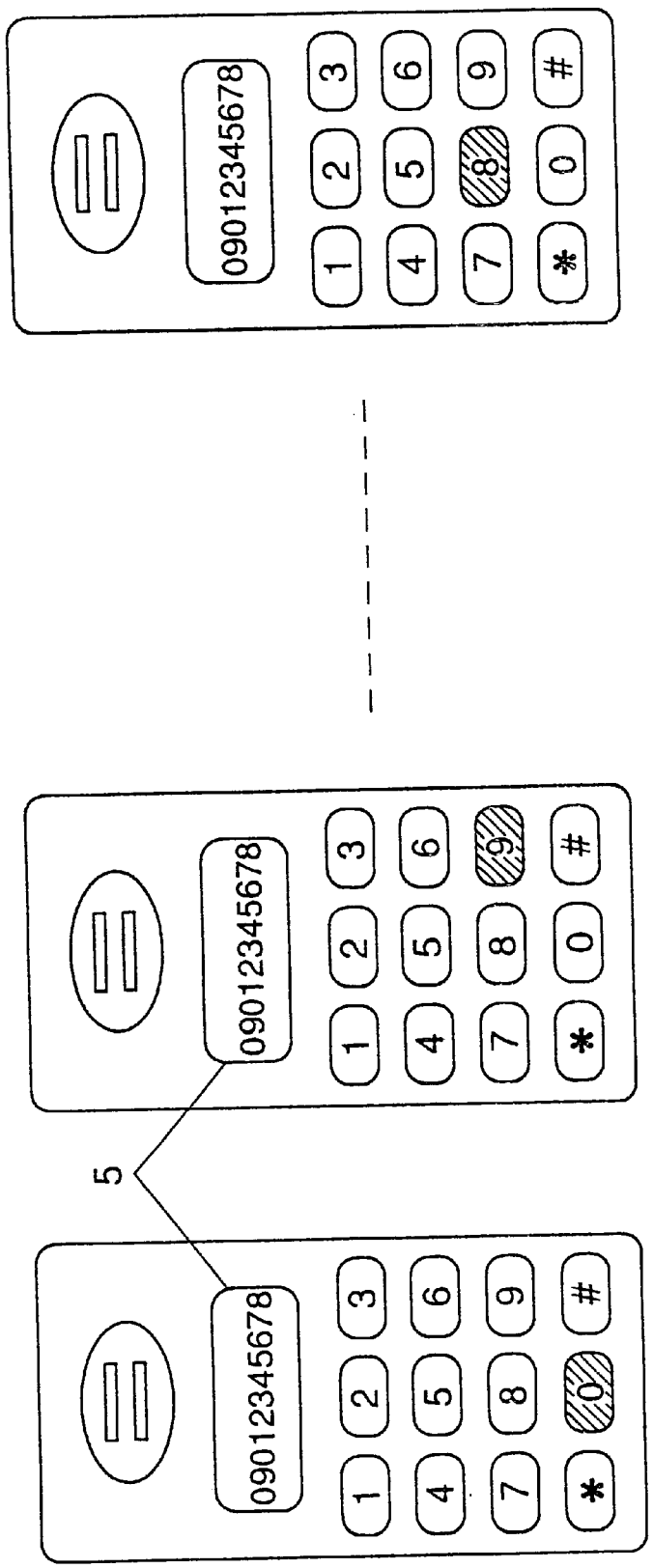
FIG. 16 is a plan showing a numerical data display state of the conventional cellular phone.

FIG. 9 to FIG. 11 show the structure of the operation buttons of the cellular phone according to exemplary embodiment 4 of the invention. In this exemplary embodiment 4, the structure of the cellular phone is same as in exemplary embodiment 1 explained in FIG. 1. The display state of numerical data is same as in FIG. 5 relating to exemplary embodiment 1, or FIG. 8 relating to exemplary embodiment 2.

FIG. 9(a) is a view of a rubber button main body 50 in exemplary embodiment 3 of the invention as seen from the key button 51 side, and FIG. 9(b) is a view seen from the opposite side. In FIG. 9(b), contact points 52 are made of conductive material.

FIG. 10(a) is a view of a circuit board 53 of the cellular phone as seen from the contact surface side of the circuit board 53 with the rubber button main body 50, and FIG. 10(b) is a view seen from the opposite side. In FIG. 10(a), contact circuits 54 are disposed at same pitches as the contact points 52 of the rubber button main body 50. The contact circuits 54 are open. Two through-holes 55 each are formed at a position adjacent to each contact circuit 54. In FIG. 10(b), illuminating parts 56 are made of LEDs or the like. The illuminating parts 56 are mounted so that the light may be emitted in the direction of the side of the key button 51 of the rubber button may body 50 by way of one through-hole of the two through-holes 55 provided each at the position adjacent to each contact circuit 54. As shown in FIG. 10(b), the configuration is same in all contact circuits 54.

FIG. 11 is a sectional magnified view of the rubber button main body 50 of the cellular phone, showing one key button 51 in a state fitted to the circuit board 53. A space 57 is formed around the contact point 52.

In the cellular phone having such structure, the other configuration is same as in exemplary embodiment 1.

The motion of the operation buttons is explained below by referring to an example of procedure of operation of sending a call.

The user first enters the partner's telephone number by pressing the key buttons 51. At this time, the air staying in the space 57 around the contact point 52 flows into the through-hole 55 at the side where the illuminating part 56 is not mounted. Therefore, the contact point 52 is pushed to contact with the contact circuit 54. Accordingly, the contact circuit 54 which has been an open circuit now becomes a closed circuit by way of the contact point 52. The circuit board 53 recognizes that the key button 51 has been pushed, and the numerical data of the pushed key button 51 is displayed in the liquid crystal device.

Thus, the input operation of the telephone number is over. The numerical data display means is same as in exemplary embodiment 1, 2 or 3.

The operation for receiving a call is same as in exemplary embodiment 1, 2 or 3.

Thus, according to the configuration of the operation buttons of exemplary embodiment 4, air vents are not needed in the rubber button main body. Therefore, the thickness is reduced by the portion corresponding to the height dimension for composing the air vents. That is, the operation button section can be reduced in thickness. Hence, the cellular phone or telephone terminal device is reduced in size. As a result, the convenience of cellular phone is further enhanced.

The number of through-holes 55 at positions adjacent to contact circuits 54 may be arbitrary.

Further, the sectional area of through-holes 55 having illuminating parts 56 is wider than the projection area of the illuminating parts 56. For example, to satisfy the condition, one through-hole 55 may be formed.

Thus, according to the invention, since the key button is illuminated by a spot light, the visual recognition of numerical data is extremely enhanced.

Moreover, by expressing one numerical data by using all key buttons, the numerical data expressed by a larger type can be confirmed. As a result, the numerical data can be displayed more clearly and visibly.

The sectional area of one through-hole of plural through-holes disposed at a position immediately beneath each key button is wider than the projection area of the illuminating part, and the operation button section can be formed thinly. As a result, the telephone terminal device is reduced in size. The convenience of telephone terminal device is further enhanced.

What is claimed is:

1. A telephone terminal device comprising:
   a plurality of key buttons,
   wherein said plurality of key buttons are selectively illuminated such that the plurality of keys illuminated form an illumination pattern corresponding to data selected from the group consisting of a numeral, a character, a symbol and a graphic pattern.

2. The telephone terminal device of claim 1, further comprising:
   a liquid crystal device displaying at least numerical data, wherein said plurality of key buttons are selectively illuminated such that the
   plurality of keys illuminated form said illumination pattern corresponding to the data displayed on said liquid crystal device.

3. The telephone terminal device of claim 2, further comprising:
   a circuit board responsible for providing functional control, wherein said circuit board controls said plurality of key buttons such that the
   plurality of keys illuminated form said illumination pattern corresponding to the data displayed on said liquid crystal device.

4. The telephone terminal device of claim 3, wherein instead of displaying data on said liquid crystal device, said circuit board controls said plurality of key buttons to display data by said illumination pattern.

5. The telephone terminal device of claim 1, wherein upon depression of a given key button, said plurality of key buttons are selectively illuminated so as to form said illumination pattern, said illumination pattern corresponding to the data designated by said given key button.

6. The telephone terminal device of claim 1, further comprising:
   a circuit board disposed beneath said plurality of key buttons, said circuit board having a plurality of through-holes, one of said plurality of through-holes being disposed immediately beneath one of said plurality of key buttons, and an illumination device for selectively illuminating said plurality of key buttons, each said key button being illuminated via said through-hole located beneath said key button.

7. The telephone terminal device of claim 6, wherein said illumination device comprises a plurality of illumination elements, each of said plurality of illumination elements being disposed beneath a given one of said plurality of through-holes.

8. The telephone terminal device of claim 7, wherein each of said plurality of through-holes operates as an air vent so as to allow for the displacement of air when the key button disposed above the given through-hole is depressed.

9. The telephone terminal device of claim 7, wherein said through-holes have a cross-sectional width which is larger than the light emitting projection areas of said illumination elements.

10. The telephone terminal device of claim 7, wherein said plurality of illumination elements do not extend into said plurality of through-holes.

11. A telephone terminal device comprising:
    a plurality of key buttons,
    a circuit board responsible for function control disposed beneath said plurality of key buttons, said circuit board having a plurality of illumination elements for selectively illuminating said plurality of key buttons, each of said plurality of illumination elements being disposed beneath a given one of said key buttons,
    wherein said plurality of key buttons are selectively illuminated such that the plurality of keys illuminated form an illumination pattern corresponding to data selected from the group consisting of a numeral, a character, a symbol and a graphic pattern.

12. The telephone terminal device of claim 11, further comprising:
    a liquid crystal device displaying at least numerical data, wherein said plurality of key buttons are selectively illuminated such that the
    plurality of keys illuminated form said illumination pattern corresponding to the data displayed on said liquid crystal device.

13. The telephone terminal device of claim 12, further comprising:
    wherein said circuit board controls said plurality of key buttons such that the plurality of keys illuminated form said illumination pattern corresponding to the data displayed on said liquid crystal device.

14. The telephone terminal device of claim 13, wherein instead of displaying data on said liquid crystal device, said circuit board controls said plurality of key buttons to display data by said illumination pattern.

15. The telephone terminal device of claim 11, wherein upon depression of a given key button, said plurality of key buttons are selectively illuminated so as to form said illumination pattern, said illumination pattern corresponding to the data designated by said given key button.

16. The telephone terminal device of claim 11, wherein said circuit board further comprises a plurality of through-holes, one of said plurality of through-holes being disposed immediately beneath one of said plurality of key buttons,
    wherein each of said plurality of illumination elements illuminates a corresponding one of said plurality of key buttons via said through-hole disposed beneath said corresponding one of said plurality of key buttons.

17. The telephone terminal device of claim 16, wherein each of said plurality of through-holes operates as an air vent so as to allow for the displacement of air when the key button disposed above the given through-hole is depressed.

18. The telephone terminal device of claim 16, wherein said through-holes have a cross-sectional width which is larger than the light emitting projection areas of said illumination elements.

19. The telephone terminal device of claim 16, wherein said plurality of illumination elements do not extend into said plurality of through-holes.

* * * * *